Patented Mar. 20, 1928.

1,663,155

UNITED STATES PATENT OFFICE.

JEAN HENRY BRÉGEAT, OF PARIS, FRANCE.

PROCESS FOR THE RECOVERY OF VOLATILE SOLVENTS.

No Drawing. Application filed August 1, 1925, Serial No. 47,648, and in France June 8, 1925.

My invention relates to a process for the recovery, on the continuous working principle, of volatile solvents which are brought over by the gases from the carbonization—or the distillation—of various substances such as coal, lignite schist, peat, wood and the like; or by the gases from the hydrogenizing of different solid or liquid products; by the gases obtained from the cracking of heavy oils; by the natural gas from oil fields; and in a general manner by all the natural or artificial gas mixtures found in industries which produce or utilize volatile solvents.

Experience has shown that the hydrogenized derivatives of naphthalene—or hydrides of naphthalene known as "tetraline" and "decaline"—may be used alone or mixed with other scrubbing liquids (for instance with bodies having phenolic functions such as the phenols or cresols or products containing the same) for the recovery of volatile solvents according to my French Patent No. 554,327 of the 21st of July, 1922, and the addition thereto No. 27,694 of the 14th of May, 1923; and it has also been found that the hydrogenized ... hydro- aromatic or alicyclic derivatives also constitute in the same conditions excellent scrubbing liquids which have a very great affinity, or absorbing power, for the various volatile solvents.

It has thus been found that the terpenes (hydrocarbons of the formula $C_{10}H_{16}$) and their derivatives will, by a suitable hydrogenizing, be transformed into liquids having a specially marked efficacity for the recovery, by the scrubbing process, of gas mixtures on the contraflow principle. Pinene, which is the simplest body of the series, and is the essential constituent of turpentine, will furnish, when it is hydrogenized, a liquid which is as clear and limpid as water and possesses a most remarkable absorbing power; it is soluble in all proportions in the known scrubbing liquids such as the tar oils, the vaseline oils, the cresols and other scrubbing liquids of the same class, and will even act as a common solvent for some of these liquids as are not miscible with each other.

The substances "hydrogenized terpenes" as used herein constitute the hydrogen addition products of terpenes. They can be made, for example, by the process as disclosed in Paal U. S. Patent 1,210,681.

In the process, according to the present invention, I effect the scrubbing of the gas mixtures containing the volatile solvents to be recovered, by means of the liquids which are formed by the hydrogenized terpenes either pure or mixed with other suitable products or reagents. As an example of the terpenes, I may mention ordinary turpentine which is the most largely used member of this group. The said hydrogenized terpenes are caused to act upon the gas mixtures containing the volatile substances to be recovered, in suitable conditions for instance by scrubbing, bubbling, surface contact and the like, and they will absorb the said substances. The volatile products are then separated by a suitable distillation of the scrubbing liquids, and are condensed in the known manner, while at the same time I obtain the scrubbing liquids in their original state; the latter are again supplied to the circulation, this affording the recovery of said volatile products by means of known apparatus, on the continuous working principle.

These substances have high absorbing power and have a pleasant odor which is capable of largely covering up the disagreeable odor of many of the substances heretofore used in the art.

I claim—

1. A process for the recovery of volatile substances carried in normally non-gaseous gaseous mixtures, which comprises the use as absorbing agents, of hydrogenized terpenes.

2. A process of absorbing vapors of normally non-solid volatile substances from gas mixtures carrying the same, by treating such gas mixtures with an absorbent liquid containing a hydrogenized terpene together with a liquid which is itself capable of use as an absorbent for the said volatile substances, and which liquid has a boiling point sufficiently higher than that of the solvent to be collected therein to allow the latter to be subsequently largely separated therefrom by fractional distillation, and which liquid is also miscible with the hydrogenized terpene, without destroying the latter.

3. A process of recovering the vapors of normally liquid volatile organic solvents which comprises the steps of adding a hydrogenized terpene to a liquid which is itself capable of absorbing vapors of organic solvents, and capable of subsequently being largely freed from the latter, for producing a mixed absorbent liquid, and thereafter bringing the solvent vapors into contact with said mixed absorbent material.

In testimony whereof I affix my signature.

JEAN HENRY BRÉGEAT.